Figure 2:
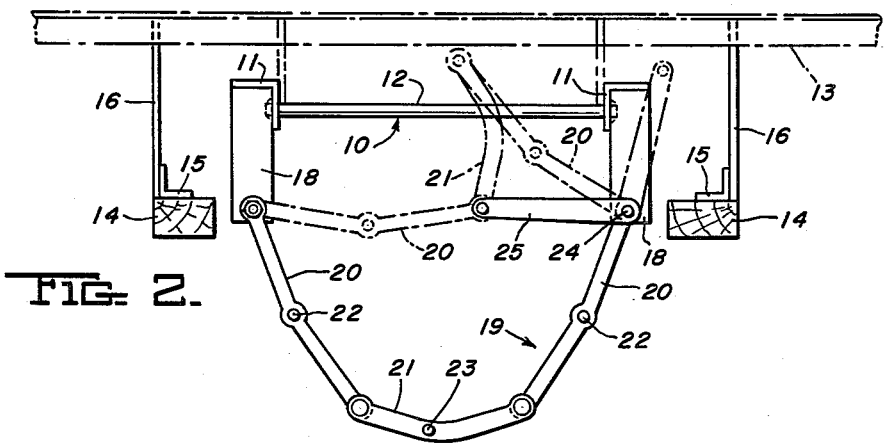

Oct. 15, 1963    W. H. RAY    3,106,986
COLLAPSIBLE SAFETY CAGE FOR LADDERS
Filed Sept. 12, 1962

INVENTOR.
WILLIAM H. RAY
By Donald G. Dalton
Attorney

3,106,986
COLLAPSIBLE SAFETY CAGE FOR LADDERS
William H. Ray, Vandergrift, Pa., assignor to United States Steel Corporation, a corporation of New Jersey
Filed Sept. 12, 1962, Ser. No. 223,184
3 Claims. (Cl. 182—106)

This invention relates generally to fixed vertical ladders and, more particularly to a safety cage for such ladders which may be collapsed when the ladder is not in use.

Safety cages of rigid, permanent construction are commonly provided for fixed vertical ladders. In some cases, however, space is so limited that such a cage would interfere with the operation normally being conducted in the vicinity of the ladder. An example is the looping pit of a strip-rolling mill. It is accordingly the object of my invention to provide a safety cage which can be collapsed to an out-of-the-way position when not needed, yet will serve every purpose of a rigid cage when extended.

In a preferred embodiment, my improved cage comprises vertically spaced sets of links pivoted together, each set constituting a self-supporting loop extending in a horizontal plane from one side of the ladder to the other. Vertical rods extend between corresponding points of adjacent loops of links. Thus when the loops and the rods carried thereby are in operative position, they form a complete cage. They may, however, be swung inwardly and collapsed so that they are entirely out of the way when not needed. A crank shaft is provided at one side of the cage to facilitate closing and opening thereof.

Figure 1:
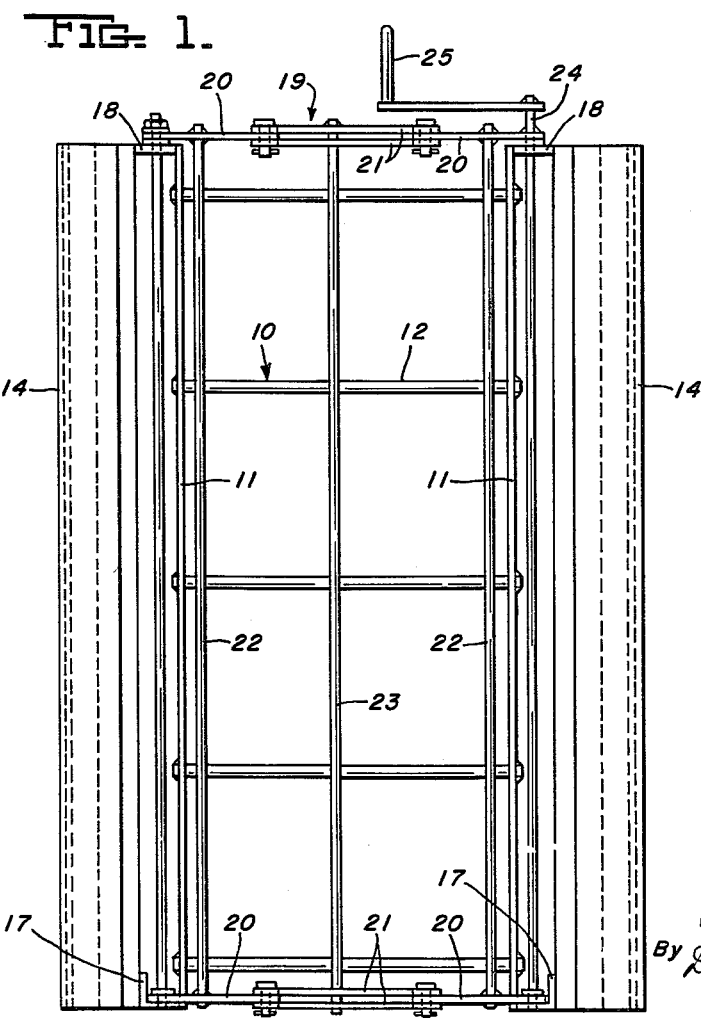

A complete understanding of the invention may be obtained from the following detailed description and explanation which refer to the accompanying drawings illustrating the present preferred embodiment. In the drawings:

FIGURE 1 is an elevation showing my improved cage installed on a conventional ladder; and FIGURE 2 is a plan view thereof.

Referring now in detail to the drawings, a ladder 10 comprising stiles 11 and horizontal bars 12 is fixed in any convenient manner to a supporting structure 13 which may be the wall of a looping pit in a strip-rolling mill. In such case, vertical skids or guards 14 of wood are preferably mounted on angles 15 carried by brackets 16 extending out from the wall, to prevent contact of the looped strip with the ladder.

Brackets 17 extend outwardly from the lower ends of stiles 11 and similar brackets 18 from the upper ends. Between each pair of brackets 17 and 18 is pivoted a loop 19 of links 20 and 21. These links are formed from flat bar and are so pivoted together that the loops formed thereby are self-supporting in a horizontal plane.

Rods 22 extend between links 20 of the two loops and a rod 23 between links 21. When the loops 19 are in the position shown in solid lines, rods 22 and 23 form a safety cage about ladder 10. When the cage is not needed, however, it may be collapsed to the dotted-line position by swinging the links 20 and 21 inwardly toward the ladder. A crank shaft 24 extending between brackets 17 and 18 on one side of the ladder, to which links 20 on that side are fixed, has a crank 25 operable by hand whereby smooth action of the loops 19 is assured in both closing and opening directions.

It will be evident that, for ladder lengths of over a few feet, the cage structure shown will have to be duplicated one or more times. In such case, shaft 24 will be the length necessary to operate all duplicate units simultaneously.

The cage of my invention is characterized by simplicity, low cost and ease of movement. At the same time, it affords full protection to those climbing a fixed vertical ladder yet is fully collapsible to a position such that it will not obstruct normal operations in the vicinity thereof.

Although I have disclosed herein the preferred embodiment of my invention, I intend to cover as well any change or modification therein which may be made without departing from the spirit and scope of the invention.

I claim:

1. A safety cage for a fixed vertical ladder comprising a plurality of loops of links spaced vertically of the ladder, each loop having its ends pivoted, respectively on axes adjacent the sides of the ladder and substantially parallel thereto, and rods extending between corresponding links of said loops.

2. The combination defined in claim 1, characterized by said links being formed of flat bar and pivotally connected so said loops are self-supporting in horizontal planes.

3. A safety cage for a fixed vertical ladder comprising a plurality of loops of links spaced vertically of the ladder, each loop having its ends pivoted on axes adjacent the sides of the ladder, respectively, rods extending between corresponding links of said loops, and a crank shaft journaled vertically and coaxially with the loop axis at one side of said ladder, the links of said loops at said one side being fixed to said shaft.

References Cited in the file of this patent
UNITED STATES PATENTS

| 268,078 | Bushnell | Nov. 28, 1882 |
| 1,921,583 | Reed | Aug. 8, 1933 |
| 2,539,664 | Hay | Jan. 30, 1951 |

FOREIGN PATENTS

| 12,635 | Great Britain | July 1, 1895 |